United States Patent
Terrell

(10) Patent No.: US 7,044,297 B2
(45) Date of Patent: May 16, 2006

(54) MODULAR CASE

(76) Inventor: Eric Terrell, 17696 Winterhawk Trail, Jupiter, FL (US) 33478

(*) Notice: Subject to any disclaimer, the term of this patent is extended or adjusted under 35 U.S.C. 154(b) by 0 days.

(21) Appl. No.: 10/272,570

(22) Filed: Oct. 16, 2002

(65) Prior Publication Data

US 2003/0029752 A1 Feb. 13, 2003

Related U.S. Application Data

(63) Continuation-in-part of application No. 09/711,820, filed on Nov. 13, 2000, now abandoned, which is a continuation-in-part of application No. 29/125,017, filed on Jun. 15, 2000, now Pat. No. Des. 442,367.

(51) Int. Cl.
*B65D 85/00* (2006.01)
(52) U.S. Cl. .................. 206/315.11; 206/315.1; 206/443; 190/102
(58) Field of Classification Search .......... 206/315.11, 206/315.1, 443, 579; 190/102
See application file for complete search history.

(56) References Cited

U.S. PATENT DOCUMENTS

| | | | |
|---|---|---|---|
| 4,182,391 A | | 1/1980 | Kjose |
| 4,598,803 A | * | 7/1986 | Ghiassi ........................ 190/108 |
| 4,640,392 A | * | 2/1987 | Decker et al. ............... 190/108 |
| 4,746,159 A | * | 5/1988 | Webb et al. ................. 294/147 |
| 4,966,260 A | * | 10/1990 | Young ......................... 190/111 |
| D332,526 S | | 1/1993 | Bowman |
| 5,319,874 A | | 6/1994 | Vance |
| 5,356,013 A | * | 10/1994 | Deioma et al. ............. 206/579 |
| 5,425,194 A | * | 6/1995 | Miller ............................ 43/26 |
| 5,538,137 A | * | 7/1996 | Deioma et al. ............. 206/579 |
| D410,333 S | | 6/1999 | Coca |
| 5,967,315 A | * | 10/1999 | Langtry, II .............. 206/315.11 |
| 6,161,692 A | * | 12/2000 | Lizarraga ................. 206/315.3 |

* cited by examiner

*Primary Examiner*—David T. Fidei
*Assistant Examiner*—Jerrold Johnson
(74) *Attorney, Agent, or Firm*—McHale & Slavin PA

(57) ABSTRACT

A modular carrying case having a substantially rigid elongated case and a separable, flexible saddle bag for carrying necessary accouterments. The modules are separable for travel on public transportation. The case has the necessary strength for being placed in a cargo hold. The saddle bag is folded into a carrying bag of a size to be acceptable for carry-on baggage.

13 Claims, 3 Drawing Sheets

MODULAR CASE

RELATED PATENT APPLICATION

This application is a continuation in part of application Ser. No. 09/711,820 filed Nov. 13, 2000 now abandoned, which is a continuation in part of application Ser. No. 29/125,017 filed Jun. 15, 2000, now U.S. D442,367.

FIELD OF THE INVENTION

This invention relates to the field of travel and in particular to carrying cases for use during transportation.

BACKGROUND OF THE INVENTION

The use of specialized carrying cases provides travelers with shipping containers designed to protect valuable products. For instance, modern fishing rods may be constructed from high strength, low weight, materials and customized to meet the personal preferences of a fisherman. Modern fishing rods may also be constructed to allow for disassembly to permit ease of transportation. Because the rods and reels are somewhat delicate in construction, carrying cases are conventional for protecting the rods and for preventing injury from unsecured parts of the rods. These carrying cases may be formed of hard materials, such as plastic or light metal, or soft woven or nonwoven textile-like materials.

All carrying cases suffer the wear and tear of travel, especially when subjected to the baggage handling concomitant with public transportation. The carrying cases usually can not be carried in the overhead bins used in public transports either because of the length of the rods or the bins being full. So, as a rule, the cases and their contents are consigned to the baggage holds of the vehicles. These small items of luggage suffer a high probability of being misplaced or mishandled and lost. Also, there is a high degree of damages suffered by such small light weight items.

Since the events of Sep. 11, 2001, the U.S. government and the airlines have instituted rigorous inspections of carry-on baggage. These inspections subject the passengers to waiting lines and long delays. Any carry-on luggage, other than the ordinary and/or simple container, is subjected to more thorough search adding to the waiting and delays.

From an organizational point of view, as well as convenience, it is also desirable to use hanging rod cases in closets, at home and while traveling. It is also desirable to pack the various accouterments used in fishing together with the rod case.

There exists an unmet need to remove the fishing rods and carrying cases from the inherent dangers of damage and loss prevalent in all transportation, especially in the baggage compartments in public transportation. There is a necessity to quickly and easily reduce the carry-on luggage to simple containers quickly inspected by security personnel.

There is a further need to provide a carrying case that can be unobtrusively carried while using the rod and reel for fishing.

DESCRIPTION OF THE PRIOR ART

Design Pat. Nos. D410,333 and D332,526 illustrate examples of fishing tackle carrying cases. Each shows a case for enclosing the tackle and straps for carrying the cases. The cases appear to be closed by a flap or a drawstring, respectively. One case appears to be made of rigid material and the other of a soft textile material.

U.S. Pat. No. 4,182,391 to Kjose is directed to a carrier for golf equipment, including clubs and shoes. The carrier is reversible so that the clubs may be accessible for play and enclosed for transport.

U.S. Pat. No. 5,319,874 to Vance is directed to a fishing rod and reel carrier. The case is padded with foam and strengthened with Masonite to protect the contents. It has loop handles for hand carrying.

U.S. Pat. No. 5,425,194 to Miller is directed to a fishing rod case formed as a cylindrical tube. The tube has end caps with latches and a carrying handle.

None of these prior art devices make any provision for a design which would facilitate transporting the case within the hang-up closet in the passenger compartment of public transportation vehicles.

The prior art does not teach the use of carrying cases for storage and organization of fishing rods in clothes closets.

Neither do these prior art devices have any mechanism that allows any reduction in size while not in use. Specifically, the prior art does not teach a modular fishing rod carrying case that has a detachable accouterment saddlebag allowing removal and shipping of the accouterment saddlebag separately.

SUMMARY OF THE INVENTION

Accordingly, it is an objective of the instant invention to teach the use of a modular carrying case which can be separated into components or modules for checked and carry-on luggage for use in public transportation.

It is an objective of the instant invention to teach the use of a modular carrying case for such items as fishing rods and accouterments which can be separated into components or modules for checked and carry-on luggage for use in public transportation.

It is another object of the invention to teach the use of the carrying case module for organizing and storing fragile items in clothes closets using a hanger.

It is a further objective of the instant invention to teach the use of a saddle bag module that can be folded to a size for under-seat storage.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
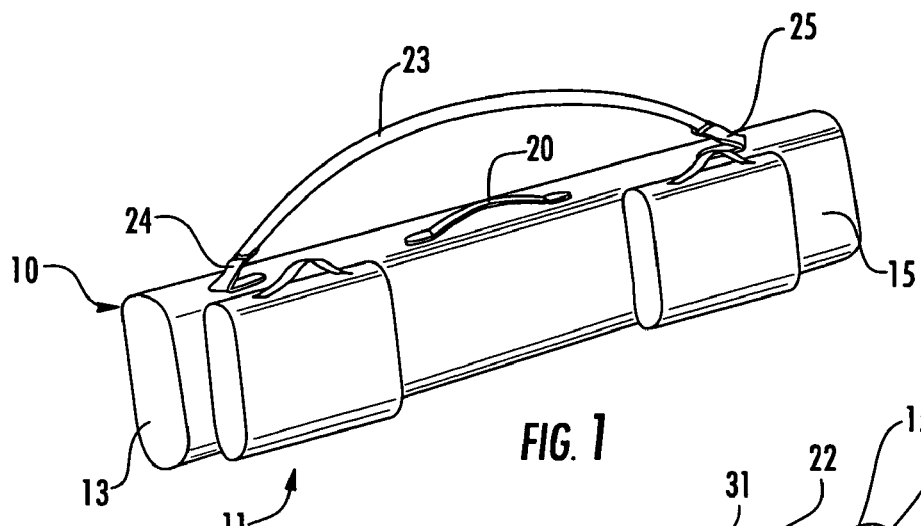
FIG. 1 is a perspective of the carrying case of this invention with saddle bag mounted.

In FIG. 1, the modular combination of the carrying case 10 and the saddle bag 11 is shown in the assembled configuration. This allows the user to carry items such as musical instruments, blueprints, guns, golf clubs, fishing rods, and so forth. For ease of illustration, this specification will use fishing rods as the primary example and embodiment. The carrying case is a reinforced tubular container 12 having a closed end 13 and an open end 14. The open end 14 has a removable cap 15 for access to the interior of the case. The cap is attached to the rod case by belt material 50.

Figure 3:
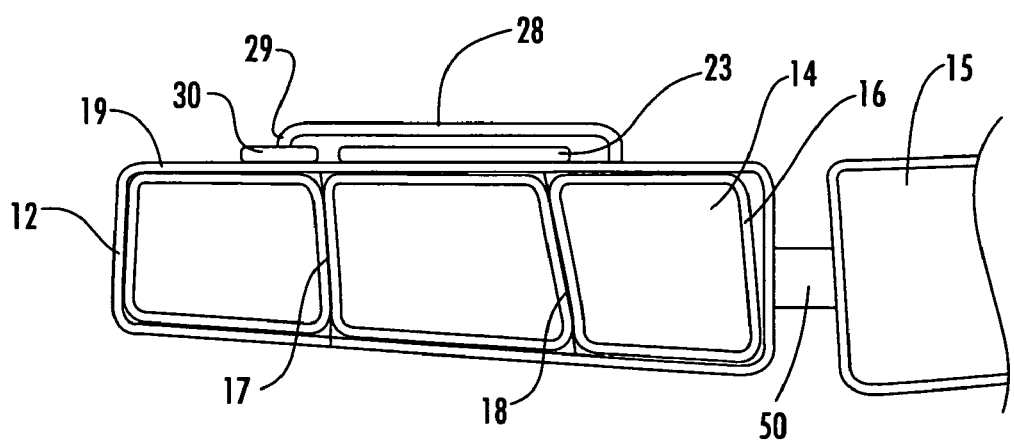
FIG. 3 is an end view of the interior of the carrying case.

The container 12 preferably has a hard polyvinylchloride, PVC, body, in the general shape of a parallelopiped, sized to accommodate several dissembled fishing rods. The interior of the PVC body, as shown in FIG. 3, may be lined with fabric, plastic or a foam material 16 to prevent shifting of the rods. The body may be further sub-divided by partitions 17 and 18, either of PVC or other stiff material to keep the enclosed rods from becoming entangled with each other. The outer surface of the PVC body is completely enclosed in ballistic cloth covering 19. This construction of the carrying case 10 has the strength and durability to withstand the rigors of baggage handling and storage typical of the environment endured by baggage shipped in cargo holds of public transportation.

The rod case 10 has a carrying handle 20 attached approximately midway along it's length. Two loops 21 and 22 are attached to either end portion of the case in line with the handle 20. The loops 21 and 22 serve as fasteners for the shoulder strap 23 which has cooperating hooks 24 and 25 at each end. The shoulder strap 23 is removable by disengaging the hooks 24 and 25 from the loops 21 and 22. The carrying handle 20 and the loops 21 and 22 may be made of a cloth, such as ballistic cloth or the like, connected to the covering 19 by sewing or other conventional fastening devices. The hooks are preferably of hard polymer but may also be made of the fabric or metal.

The saddle bag 11 is preferably made of ballistic fabric or other flexible material. As shown in FIG. 1, the elongated saddle bag is draped over the rod case and held in place by openable fasteners. In use, the rod case and saddle bag could be packed and carried to the airport assembled. At the airport the saddle bag could be separated from the rod case. The rod case could then be checked for cargo baggage. The saddle bag 11 may be folded into a compact hand bag sized to fit under the airplane seat and carried through check-in.

Figure 2:
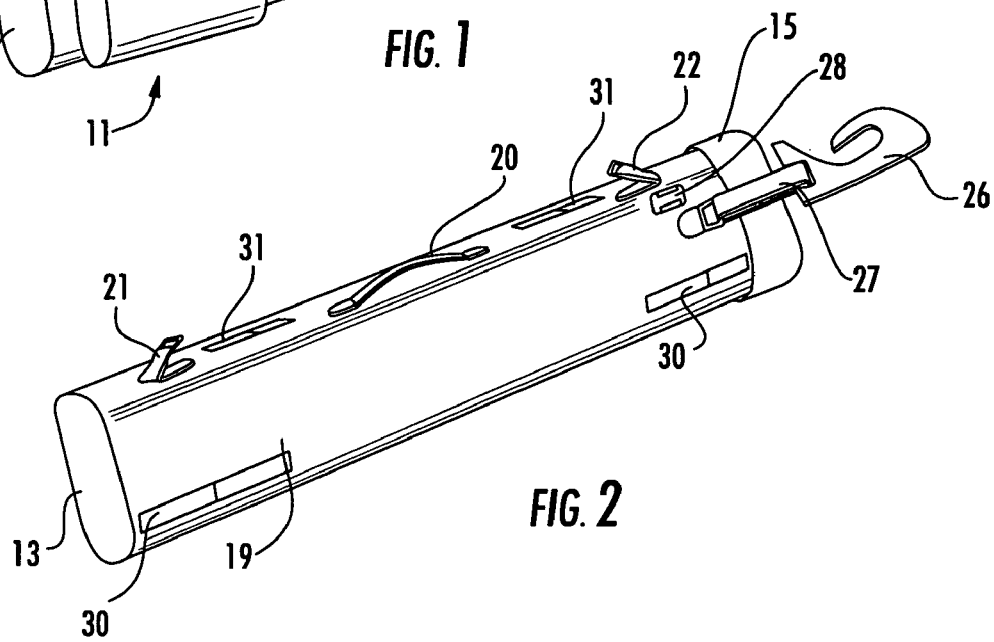
FIG. 2 is a perspective view of the carrying case of FIG. 1 without the saddle bag.

As shown in FIG. 2, the rod case can be suspended or hung by a hook-shaped element 26. This hook may be used to store the rod case in a closet at home or in a room while traveling. The hook 26 is attached to the rod case covering 19 by a fabric belt 27. The belt and hook are stored under a fabric flap 28 when not in use. The flap 28 is fixed along one edge to the covering 19 and the opposite edge has an openable fastener, such as Velcro, with the hook fabric 29 on the flap and the loop fabric 30 on the covering 19 or vice versa.

The modules are secured together by separable fasteners, preferably hook-and-loop material, known as Velcro. Other separable fasteners such as hooks and eyes, snap fasteners, buttons and holes, zippers, and adhesive or cohesive materials, may be used. The rod case has fasteners 30 at each lower corner portion. Additional fasteners 31 are located on the top of the case laterally on each side of the carrying handle 20.

Figure 4:
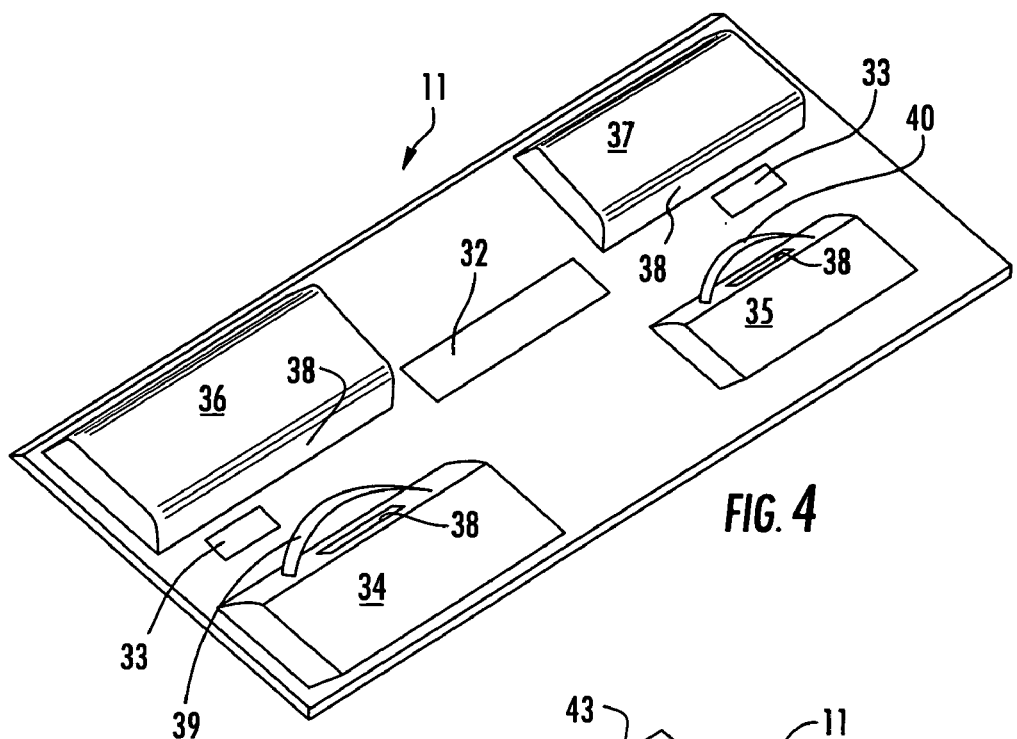
FIG. 4 is a plan view of the saddle bag from the outside.

As shown in FIG. 4, the saddle bag module is generally rectangular in shape and has aligned openings along it's mid line. The opening 32 accommodates the carrying handle 20 of the rod case. The openings 33 accommodate the loops 21 and 22 that attach to the shoulder strap 23. Pockets 34, 35, 36 and 37 are affixed near each corner of the saddle bag 11.

Each of the pockets are closed by separable fasteners 38, preferably zippers, though other fasteners may be used. The pockets are of such size to accommodate reels, line spools, lures and other accouterments. The pockets may be lined with shock absorbent material to protect the contents. At least two of the pockets have carrying handles attached on opposite ends of the fasteners. For illustration and not limitation, carrying handles 39 and 40 are attached to pockets 34 and 35, respectively. The carrying handles 39 and 40 also have cooperating elements of Velcro 41 and 42 or other separable fasteners (not shown) attached approximately midway of the span for temporarily securing the handles together after separation from the rod case.

Figure 5:
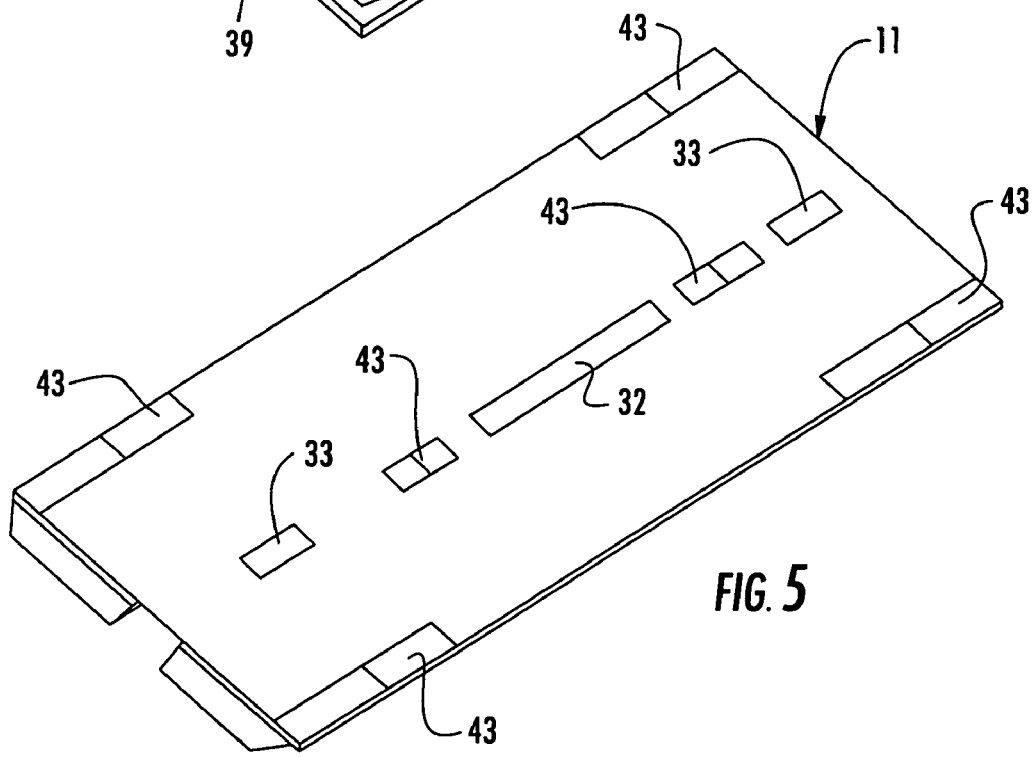
FIG. 5 is a plan view of the inside of the saddle bag.

As shown in FIG. 5, the underside of the saddle bag 11 has cooperating separable fasteners 43 located near each corner of the module. Along the central axis of the saddle bag 11, other separable fasteners 44 are located for stabilizing the position of the saddle bag on the rod case. The fasteners 43 cooperate with the fasteners 31 and the fasteners 43 cooperate with the fasteners 30 to secure the modules in the assembled position. As mentioned, these fasteners are preferably Velcro but other fastening devices may be used.

Figure 6:
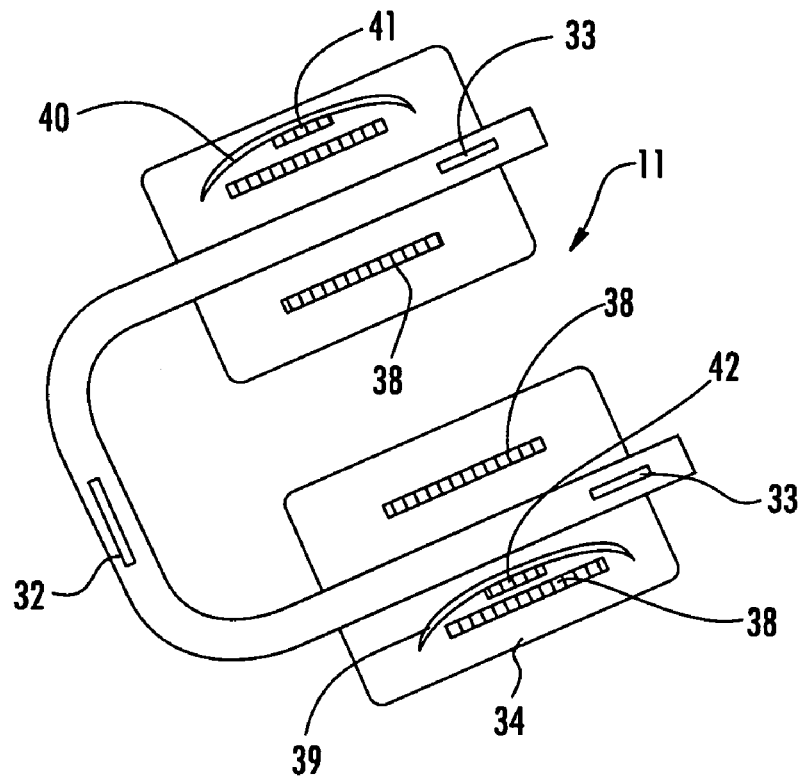
FIG. 6 is a top view of the folded saddle bag.
Figure 7:
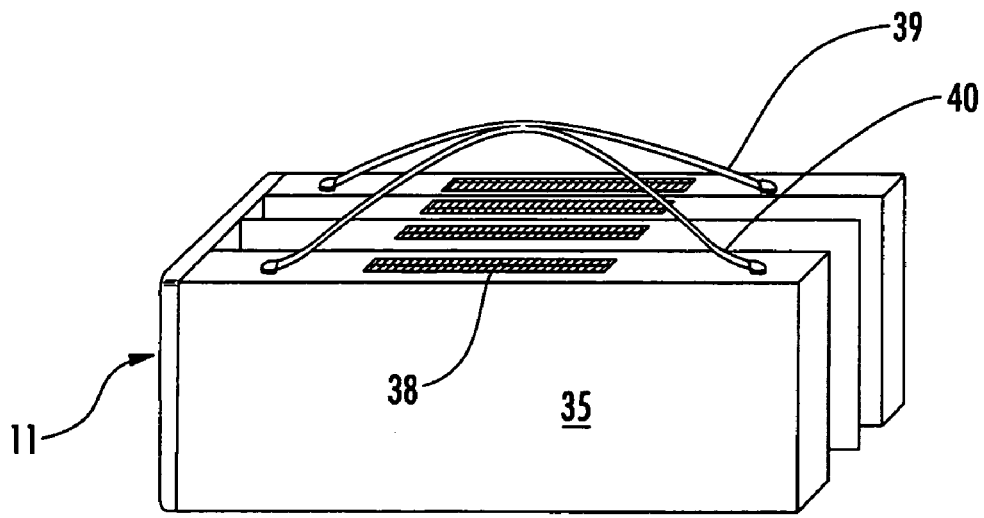
FIG. 7 is a side view of the folded saddle bag.

The entire saddle bag module 11 is made of ballistic cloth or other strong durable material including, knitted, woven, non-woven or film structures. The saddle bag is flexible to such a degree that the saddle bag may be doubled upon itself in the longitudinal direction and width-wise to result in a carrying bag not much larger than the size of the individual pockets. In this configuration, shown in FIGS. 6 and 7, the saddle bag module 11 complies with the size requirements for airline carry-on luggage.

What is claimed is:

1. A modular carrying case comprising a substantially rigid, elongated case for transportation of items, said carrying case having a first closed end and a second end closed by a removable cap, and an elongated flexible saddle bag mounted on and supported by said carrying case for transporting accouterments, said carrying case includes a first set of a plurality of separable fasteners affixed thereto, said saddle bag having a second set of a plurality of separable fasteners affixed thereto, said first and second sets of fasteners cooperating to temporarily secure said carrying case and said saddle bag together; said saddle bag adapted to be removed from said carrying case and folded to reduce the length, a plurality of flexible pockets attached to said saddle bag, said pockets each having a separable closure therein, and a carrying handle attached to said saddle bag, a handle connected to said case intermediate the ends thereof, a plurality of openings aligned along the length of said elongated saddle bag and located intermediate said pockets, said handle extending through at least one of said plurality of openings.

2. A modular carrying case of claim 1 further comprising a flexible belt attached at one end near said second end of said carrying case, a suspension hook attached to the other end of said flexible belt, said hook adapted to hang said carrying case from a support.

3. A modular carrying case of claim 1 further comprising partitions in said carrying case for separating several fishing rods.

4. A modular carrying case of claim 1 further comprising a shoulder strap attached to said carrying case near said first and said second ends, a plurality of openings in said saddle bag aligned intermediate said pockets, said shoulder strap extending through said openings.

5. A modular carrying case of claim 1 further comprising said carrying handle including an element connected to one of said plurality of pockets and another element connected to a second of said plurality of pockets, said elements having a cooperating fasteners thereon, said elements adapted to be temporarily fastened together when said saddle bag is folded to reduce the length.

6. A travel kit comprising a carrying case and a flexible saddle bag, said saddle bag having a generally rectangular shape, at least one opening aligned along a longitudinal center line, an inner surface and an outer surface with flexible pockets attached to said outer surface near said corners, said saddle bag having a first fold along the longitudinal center line to bring said inner surface and corners into juxtaposition, said inner surface having engaged cooperating separable fasteners at each of said corners, said saddle bag having a second fold line perpendicular to said first fold and between said pockets to reduce the length of said generally rectangular shape, a carrying handle connected to at least one pocket, and said case includes a rigid generally parallelopiped container with one end and a second end closed with a removable cap, a handle attached approximately midway long a longitudinal axis of said parallelopiped, separable fasteners attached to said case near the corners farthest removed from said handle, said separable fasteners adapted to cooperate with said separable fasteners on said saddle bag whereby said saddle bag is adapted to be unfolded and placed over said case with said handle extending through said opening, said cooperating separable fasteners on said saddle bag are disengaged with each other and disposed on the separable fasteners attached to said case to secure said case and said saddle bag together.

7. A travel kit of claim 6 further comprising said saddle bag fabricated from a durable strong material and said case is enclosed with a support hook for suspending said kit from a support.

8. A travel kit of claim 7 further comprising a belt attached near said second end of said case, said belt connected to a support hook for suspending said kit from a support.

9. A combination fishing rod case and saddle bag comprising a substantially rigid elongated rod case adapted to hold several dissembled fishing rods, said case having one closed end and a second end closed by a removable cap, said rod case enclosed by a strong, durable material, a handle attached to said rod case midway along the upper longitudinal axis, separable fasteners connected to said rod case near lower longitudinal extremities, said saddle bag composed of a flexible, strong and durable material, said saddle bag having a general rectangular shape with an opening midway along the longitudinal centerline, flexible pockets are attached on one side of said material near each corner, said handle extending through said opening, separable fasteners attached to the other side of said saddle bag at the corner portions, said separable fasteners attached to said saddle bag cooperating to temporarily secure said rod case and said saddle bag together.

10. A combination of claim 9 further comprising additional separable fasteners connected to said rod case with said handle located intermediate and other separable fasteners attached to said saddle bag with said opening intermediate.

11. A combination of claim 9 further comprising a belt connected to said rod case near said second end, said belt terminating with a hook, said hook adapted to support said rod case.

12. A combination of claim 9 further comprising openable closures on each of said pockets.

13. A combination of claim 9 further comprising multiple partitions in said rod case.

* * * * *